United States Patent
Kemmochi et al.

(10) Patent No.: US 8,272,234 B2
(45) Date of Patent: Sep. 25, 2012

(54) SILICA CRUCIBLE WITH PURE AND BUBBLE FREE INNER CRUCIBLE LAYER AND METHOD OF MAKING THE SAME

(75) Inventors: Katsuhiko Kemmochi, Camas, WA (US); Robert Joseph Coolich, North Bonneville, WA (US)

(73) Assignee: Heraeus Shin-Etsu America, Inc., Camas, WA (US)

( * ) Notice: Subject to any disclaimer, the term of this patent is extended or adjusted under 35 U.S.C. 154(b) by 761 days.

(21) Appl. No.: 12/370,517

(22) Filed: Feb. 12, 2009

(65) Prior Publication Data

US 2010/0154701 A1    Jun. 24, 2010

Related U.S. Application Data

(60) Provisional application No. 61/139,405, filed on Dec. 19, 2008.

(51) Int. Cl.
*C03B 19/09* (2006.01)
*C03B 19/00* (2006.01)

(52) U.S. Cl. ............. 65/17.3; 65/17.4; 65/17.5; 65/17.6

(58) Field of Classification Search ........... 65/17.3–17.6
See application file for complete search history.

(56) References Cited

U.S. PATENT DOCUMENTS

| | | | |
|---|---|---|---|
| 4,416,680 A * | 11/1983 | Bruning et al. ................. | 65/144 |
| 4,935,046 A | 6/1990 | Uchikawa et al. | |
| 4,956,208 A | 9/1990 | Uchikawa et al. | |
| 5,762,672 A | 6/1998 | Ikeda et al. | |
| 5,913,975 A | 6/1999 | Holder | |
| 5,989,021 A * | 11/1999 | Sato et al. ...................... | 432/264 |
| 6,136,092 A * | 10/2000 | Sato et al. ........................ | 117/84 |
| 6,143,073 A | 11/2000 | Christman et al. | |
| 6,502,422 B1 | 1/2003 | Hansen et al. | |
| 6,510,707 B2 | 1/2003 | Kemmochi et al. | |
| 6,546,754 B1 | 4/2003 | Hansen et al. | |
| 6,553,787 B1 | 4/2003 | Akiho et al. | |
| 6,641,663 B2 | 11/2003 | Kemmochi et al. | |

(Continued)

FOREIGN PATENT DOCUMENTS

DE    1 965 558 A    9/1970

(Continued)

OTHER PUBLICATIONS

JP09-020586 machine translation, Sakikubo Kunihiko, Production of Quartz Glass Crucible for Pulling Silicon Single Crystal, Jan. 21, 1997.

*Primary Examiner* — Matthew Daniels
*Assistant Examiner* — Russell Kemmerle, III
(74) *Attorney, Agent, or Firm* — Marger Johnson & McCollom PC

(57) ABSTRACT

A method of making a silica crucible in a mold cavity of the type in which air is drawing through silica grain placed in the mold cavity. A pure silica grain layer is formed on top of a natural silica grain layer. At least a portion of the purse silica grain layer is fused while substantially no air is drawn through the silica grain. Any remaining pure silica grain and a least a portion of the natural silica grain layer is fused while drawing a substantially higher volume of air through the silica. At least a portion of the fused pure silica grain layer is then sublimated.

37 Claims, 8 Drawing Sheets

U.S. PATENT DOCUMENTS

| | | |
|---|---|---|
| 6,652,934 B1 | 11/2003 | Miyao et al. |
| 6,886,364 B2 | 5/2005 | Ohama et al. |
| 7,118,789 B2 | 10/2006 | Kemmochi et al. |
| 7,383,696 B2 | 6/2008 | Kemmochi et al. |
| 7,993,556 B2 * | 8/2011 | Kemmochi et al. ............ 264/114 |
| 2002/0166341 A1 * | 11/2002 | Shelley et al. ................. 65/17.3 |
| 2003/0029195 A1 * | 2/2003 | Watanabe ...................... 65/17.4 |
| 2003/0074920 A1 | 4/2003 | Ohama et al. |
| 2007/0051296 A1 | 3/2007 | Kemmochi et al. |
| 2007/0051297 A1 | 3/2007 | Kemmochi et al. |
| 2007/0102133 A1 * | 5/2007 | Kemmochi et al. ............ 164/335 |
| 2009/0041960 A1 * | 2/2009 | Kemmochi et al. ........... 428/34.4 |
| 2009/0277223 A1 | 11/2009 | Kayser et al. |
| 2011/0123738 A1 * | 5/2011 | Kemmochi et al. ........... 428/34.4 |
| 2011/0192758 A1 * | 8/2011 | Yamagata et al. ........ 206/524.6 |

FOREIGN PATENT DOCUMENTS

| | | |
|---|---|---|
| EP | 0 693 461 A | 1/1996 |
| EP | 1 094 039 A1 | 4/2001 |
| JP | 63166791 | 7/1988 |
| JP | 01-157427 A | 6/1989 |
| JP | 01-157428 A | 6/1989 |
| JP | 7196397 | 8/1995 |
| JP | 08-268727 A | 10/1996 |
| JP | 09-020586 A | 1/1997 |
| JP | 11-199369 A | 7/1999 |
| JP | 2000-264776 A | 9/2000 |
| JP | 2000-344536 A | 12/2000 |
| JP | 2001-002430 A | 1/2001 |
| JP | 2001-233629 A | 8/2001 |
| JP | 2001-302391 A | 10/2001 |
| JP | 2001-328831 | 11/2001 |
| JP | 2001-328831 A | 11/2001 |
| JP | 2003-313035 A | 11/2003 |
| JP | 2004-517793 A | 6/2004 |
| JP | 2004-518601 A | 6/2004 |
| JP | 2004-292211 A | 10/2004 |
| JP | 2004-292214 A | 10/2004 |
| JP | 2005-343707 A | 12/2005 |
| JP | 2006-124235 A | 5/2006 |
| JP | 2009-084113 A | 4/2009 |
| WO | 2007/063996 A | 6/2007 |

* cited by examiner

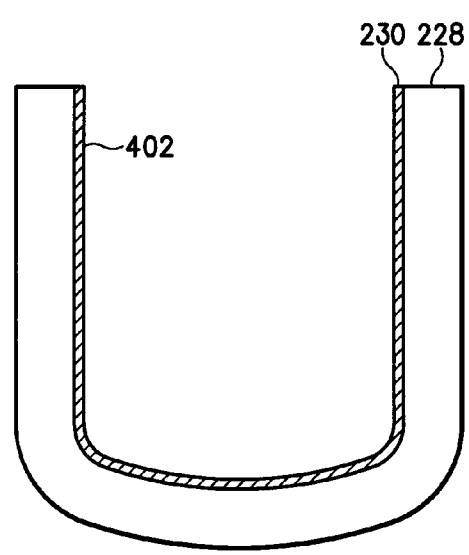
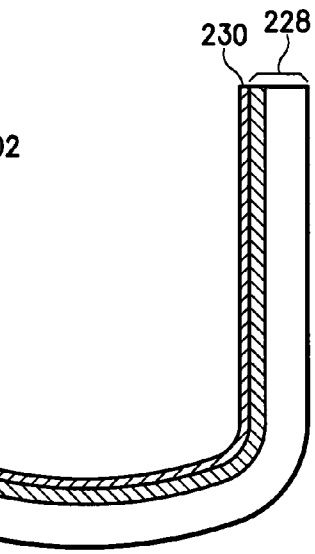
FIG.4A  FIG.4B
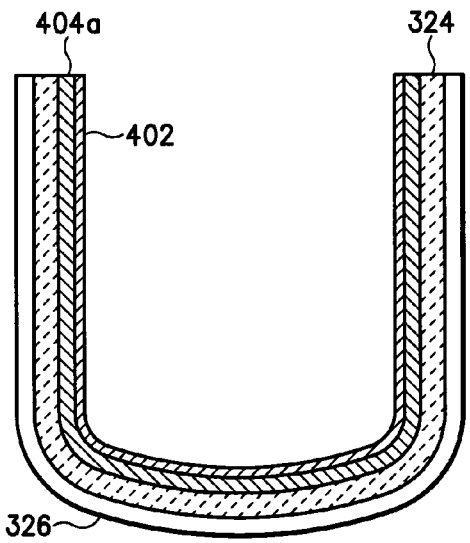
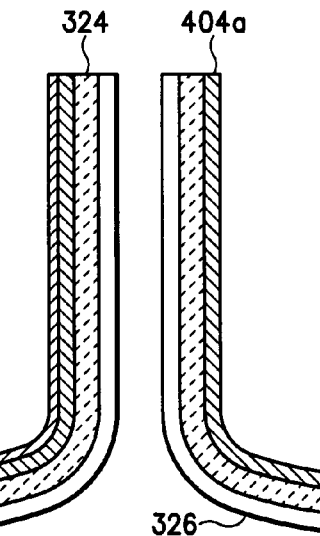
FIG.4C  FIG.4D

SILICA CRUCIBLE WITH PURE AND BUBBLE FREE INNER CRUCIBLE LAYER AND METHOD OF MAKING THE SAME

CROSS-REFERENCE TO RELATED APPLICATION

This application claims priority from U.S. Provisional Application Ser. No. 61/139,405, filed on Dec. 19, 2008.

BACKGROUND

1. Field of Invention

Embodiments of the present invention generally relate to silica crucibles and methods of making the same. More particularly, embodiments of the present invention relate to silica crucibles with highly pure and bubble free inner crucible layers and methods of making the same.

2. Discussion of the Related Art

There are several methods for making single crystal silicon materials. One such process—the "Czochralski" (CZ) process—has been widely adopted for producing single crystal silicon materials for semiconductor applications including solar cell applications. In the CZ process, molten silicon is contained within a vessel and a tip of a single-crystalline seed crystal is dipped into the molten silicon. The seed crystal is then "pulled" while being rotated. As a result, a single crystal silicon ingot is grown from the molten silicon.

A crucible is one vessel commonly employed in this pulling operation for making silicon ingots. Crucibles are typically configured in a bowl shape to contain the molten silicon during the pulling operation. Crucibles are made of silica glass, or quartz glass, to introduce a desired amount of oxygen into the molten silicon while keeping if from contamination with metallic impurities.

During the CZ process, the inner surface of a silica glass crucible typically dissolves into the molten silicon. Any bubbles present in the inner crucible layer may open to the melt by dissolution and are a potential source of particles that may disturb the single-crystalline structure of the silicon ingot. Therefore, crucibles are typically manufactured to have a bubble-free inner crucible layer. The outer crucible layers are typically manufactured to contain numerous tiny bubbles to facilitate scattering of radiation from heater elements.

To minimize the possibility of contamination of the silicon ingot during the CZ process, the inner crucible layer should be as pure as possible.

Silica glass made from natural quartz grain often contains an Al content of 5-20 ppm. The Al element in the silica glass is often associated with positively charged metallic impurities such as Li, Ca and Na. Therefore, reduction of Al content is desirable to minimize concentration of other metallic elements.

One known method of manufacturing silica glass crucibles or quartz glass crucibles, is to form silica grain, which can be synthetic silica grain or natural quartz grain, in a crucible shape inside of a rotating mold, then fuse it into a silica glass crucible. The crucible is taken out of the mold and mechanically finished and cleaned to a final product.

During fusion, silica sublimates from the inner surface of the inner crucible layer. As silica sublimates faster than alumina, when natural quartz grain is used as the starting material, aluminum is left on the inner surface of the inner crucible layer. As mentioned above, aluminum is associated with other metallic impurities.

One method disclosed in Japanese Patent JP 63-166791, is understood to minimize the Al content at the inner surface of the inner crucible layer by etching the surface of the inner crucible layer with hydrofluoric acid. This method, however, is not economical or environmentally preferable due to the use of hydrofluoric acid.

Another known method of manufacturing quartz glass crucibles, disclosed in U.S. Pat. No. 6,510,707, is understood to make the inner crucible layer bubble-free with little bubble growth and reduce the Al content at the inner surface of the inner crucible layer. A crucible is fused by employing a relatively large amount of electrical power to reduce bubble and bubble growth leaving an aluminum-rich layer on the surface of the inner crucible layer. The aluminum-rich layer is then removed by abrasive processes or etching processes. While this method can produce an inner crucible layer that may be relatively bubble-free with little bubble growth during the CZ process, abrading or etching the aluminum rich layer is time consuming and not economical.

Consequently it would be desirable to prepare a silica crucible having an inner crucible layer with minimal impurity concentration and reduced bubble and bubble-growth at reasonable cost.

BRIEF DESCRIPTION OF THE DRAWINGS

FIGS. 4A-4D are cross-sectional views illustrating a method of fusing a crucible at various stages of a crucible-manufacturing process, according to one embodiment of the present invention.

DETAILED DESCRIPTION

Figure 1:
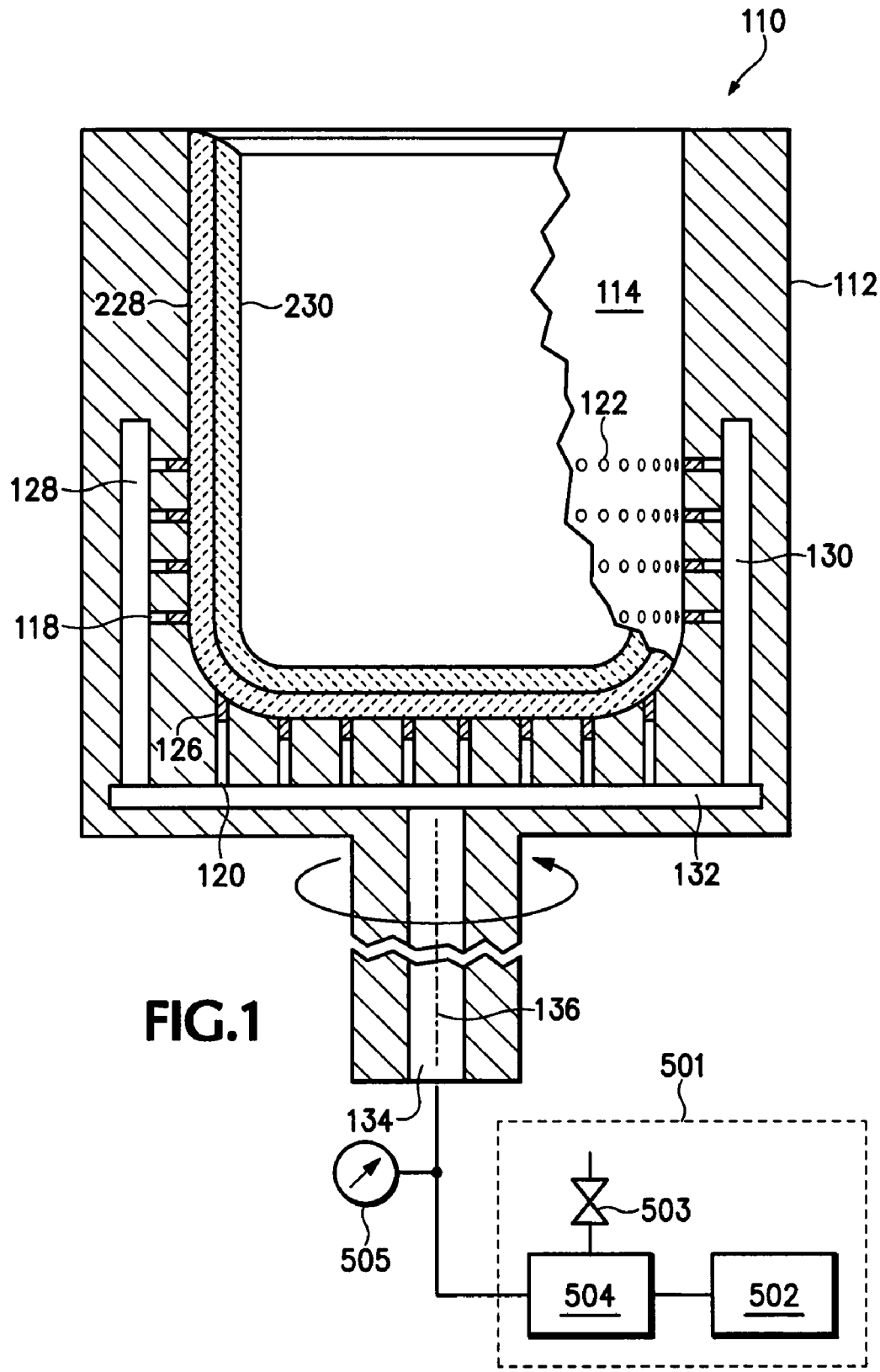
FIG. 1 is a cross-sectional, somewhat schematic, view of an apparatus capable of producing a crucible in accordance with one embodiment of the present invention.

FIG. 1 is a cross-sectional, somewhat schematic view, of an apparatus capable of manufacturing a crucible in accordance with one embodiment of the present invention.

FIG. 1 is a cross section of a mold 112 with two layers of silica grain formed in the mold ready for fusing. As will be explained, the fusion process includes five stages.

Referring to FIG. 1, an apparatus 110 for manufacturing silica glass crucible may be provided as described in U.S. Pat.

No. 7,383,696, which is incorporated herein by reference in its entirety. For example, the apparatus 110 may include a rotating mold 112 having an inner mold surface 114 that defines a mold cavity.

A plurality of air channels, like channels 118 and 120, communicate with inner mold surface 114. Each air channel 118 and 120 comprises a cylindrical bore that creates a circular opening, like opening 122 in inner mold surface 114. Each air channel, like channel 120, includes a porous graphite plug 126 that prevents silica grain from being drawn from the mold cavity into the air channels. The air channels communicate with manifolds, like manifolds 128, 130, 132, which in turn communicate with a bore 134. An evacuation system 501 is connected to bore 134.

The evacuation system 501 is configured to draw air from the mold cavity via the air channels and ultimately through bore 134 and out of apparatus 110. The evacuation system is configured for programmable evacuation power, at least for controlling starting and stopping times. In one embodiment, an evacuation pump 502 has a set of control valves 504, which includes at least a leak valve 503, which vents to the room atmosphere. A pressure gauge 505 is connected to the evacuation bore 134. The pressure reading is used as an indication of pressure at the fusion front.

In one embodiment, mold 112 contains a natural quartz grain layer 228 and a pure silica grain layer 230 (which are shown partially broken away to expose the inner mold surface 114). The natural quartz grain layer 228 and the pure silica grain layer 230 are collectively referred to as a the entire silica grain layer.

Figure 2A:
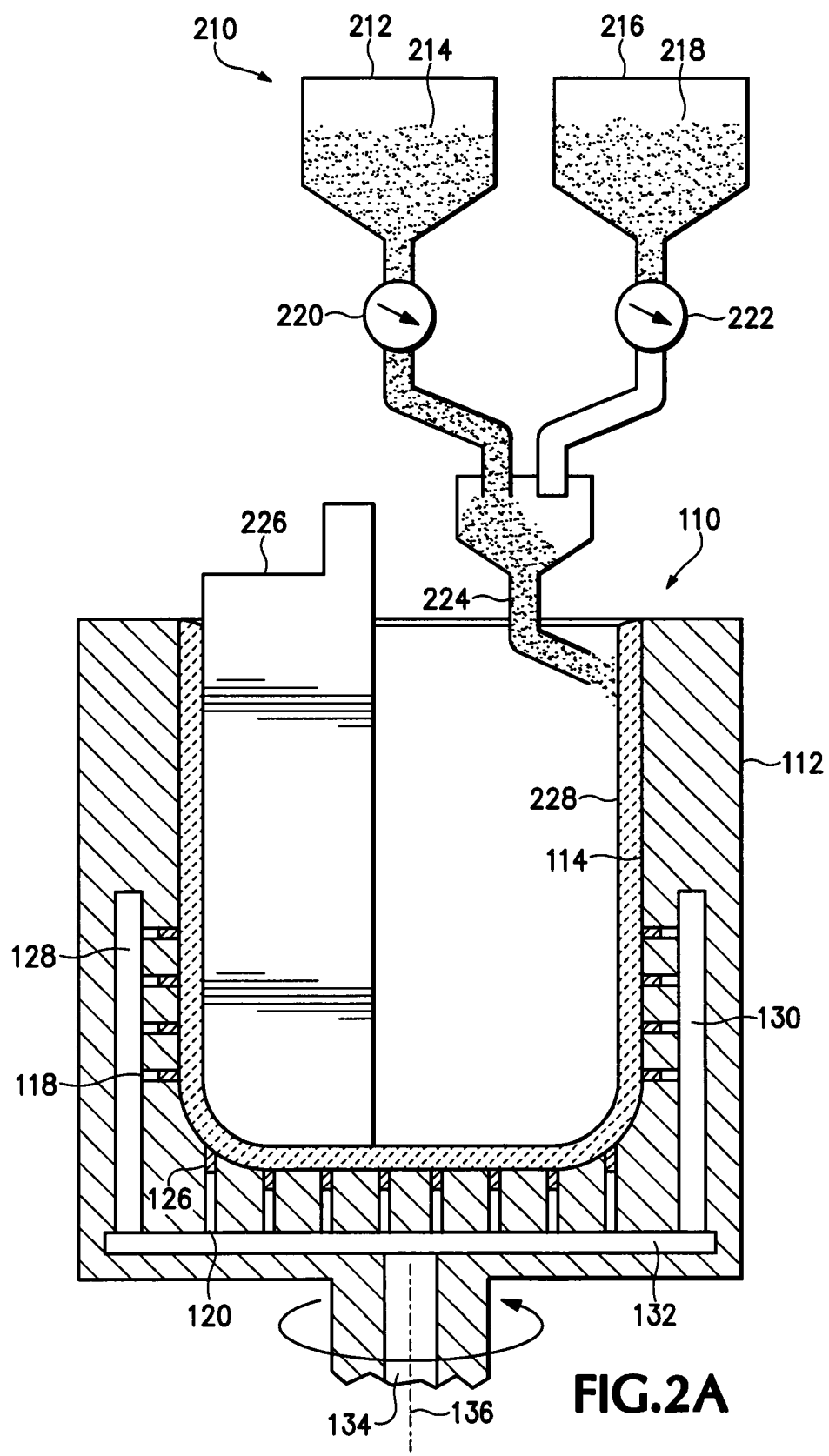
FIGS. 2A and 2B are cross-sectional, somewhat schematic, views illustrating a method of forming silica grain layers using a feed system in accordance with one embodiment of the present invention.
Figure 2B:
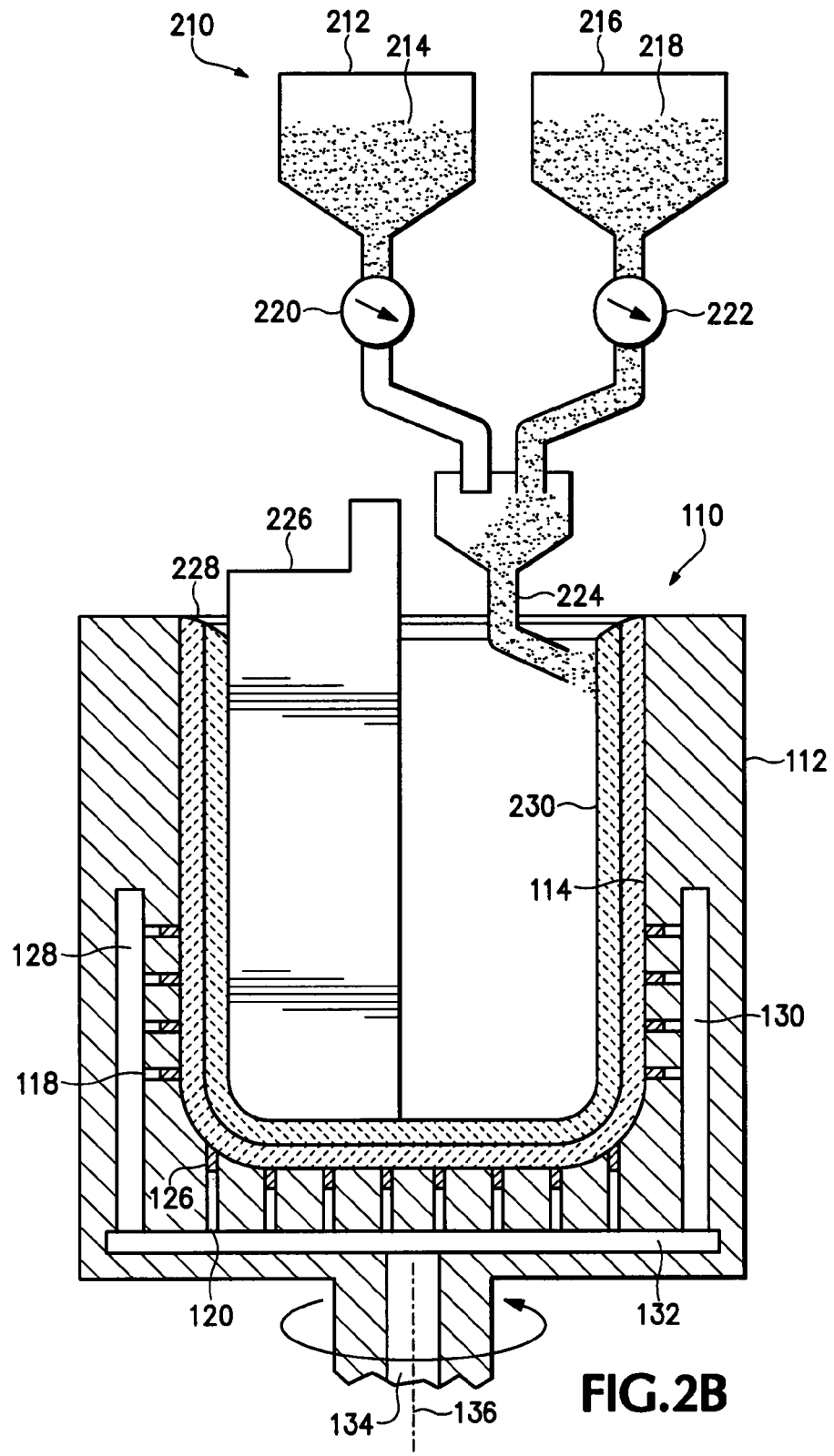

The procedures to form two layers of silica grain are explained using FIGS. 2A and 2B. FIGS. 2A and 2B are cross-sectional, somewhat schematic views, illustrating a method of forming silica grain layers using a feed system in accordance with one embodiment of the present invention.

Referring generally to FIGS. 2A and 2B, the feed system 210 may, for example, include a natural quartz grain hopper 212 containing natural quartz grain 214, a pure silica grain hopper 216 containing pure silica grain 218, valves 220 and 222 and a feed tube 224. A spatula 226 may also be provided that is vertically movable into and out of mold 112. The spatula 226 may further be horizontally movable within the mold 112 to shape the silica grain as the mold 112 rotates about the vertical axis 136.

In one embodiment, the natural quartz grain 214 contains impurities such as Al, Ca, Li and K. The natural quartz grain 214 may have, in part, an Al content of about 6 ppm; Ca content of about 1.3 ppm; Li content of about 0.7 ppm; K content about 0.1 ppm; and Na content of about 0.05 ppm.

In one embodiment, the pure silica grain 218 is synthesized from silicon tetra chloride purified through a distillation processes. In one embodiment, the pure silica grain may have a total metallic content of less than 1 ppm, with an Al content of less than 0.2 ppm.

The flow of natural quartz grain 214 and pure silica grain 218 (collectively referred to as "silica grain") from grain hoppers 212 and 216 may be controlled by regulating valves 220 and 222, respectively. The feed tube 224 introduces the flow of silica grain into mold 112 from either one of the hoppers, depending upon how valves 220 and 222 are set.

Referring to FIG. 2A, the mold 112 is rotated about the vertical axis 136 at a rate of about 70 rpm to about 150 rpm, the feed tube 224 is positioned adjacent to the inner mold surface 114, and valve 220 is opened to begin depositing natural quartz grain 214 to form a natural quartz grain layer 228 about the perimeter of the mold cavity. The thickness of the natural quartz grain layer 228 (measured along a radial axis of the mold 112) is defined by the position of spatula 226. In one embodiment, the thickness of the natural quartz grain layer 228 may have a range of about 15 mm to about 30 mm.

Referring to FIG. 2B, after the natural quartz grain layer 228 is formed, valve 220 is closed and valve 222 is opened while the mold 112 is rotated about the vertical axis 136. As pure silica grain 218 feeds from the pure silica grain hopper 216 out of feed tube 224 a pure silica grain layer 230 coats the inner surface of the natural quartz grain layer 228. In one embodiment, the thickness of the pure silica grain layer 230 may have a range of about 1 mm to about 5 mm. In one embodiment, the thickness of the entire silica grain layer, which is the combined thickness of the natural and pure silica grain layers 228 and 230, may be about 25 mm to 30 mm.

After forming the pure silica grain layer 230, the feed system 210 and the spatula 226 are moved out of the rotating mold 112 so that the entire silica grain layer may be fused to form a crucible.

Figure 3:
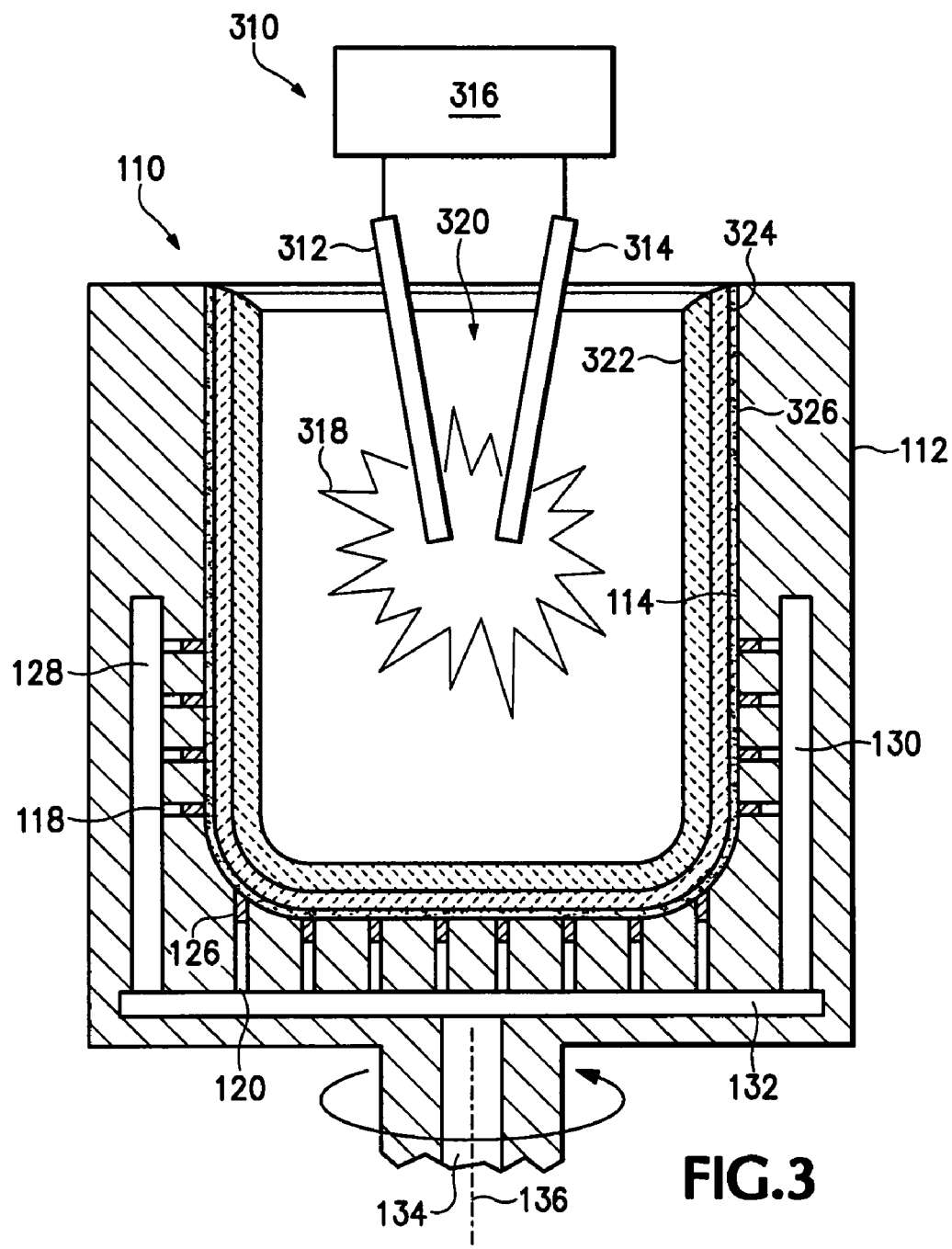
FIG. 3 is a cross-sectional, somewhat schematic, view illustrating a method of fusing silica grain layers using a grain fusing system in accordance with one embodiment of the present invention.

FIG. 3 is a cross-sectional, somewhat schematic view, illustrating a method of fusing an entire silica grain layer using a grain fusing system 310 in accordance with one embodiment of the present invention. The grain fusing system has a programmable power supply 316 and electrodes 312 and 314 connected to the power supply. In one embodiment of this invention the programmable range of the power supply 316 is from 50 kVA to 1200 kVA.

Referring to FIG. 3, after the feed system 210 is withdrawn from the rotating mold 112, a grain fusing system 310 is moved into the cavity of the rotating mold 112 to fuse the entire silica grain layer. Hot arc plasma 318 fuses the entire silica grain layer thereby forming a crucible 320. Crucible 320 has layers 322, 324 that do not necessarily correspond to grain layers 228, 230 (in FIG. 2B). Rather layers 322, 324 are formed as a result of different steps in the following described process. As will be seen, layer 322 may include part of pure silica layer 230, all of layer 230, or all of layer 230 and part of natural quartz grain layer 230.

The evacuation system 501 is operated as programmed and gas is drawn from the interior of the rotating mold 112, through the entire silica grain layer into the air channels, like air channels 118 and 120. Generally, fusion of the entire silica grain layer starts at the innermost surface. The fusion front then moves outwards until it stops, leaving a thin unfused grain layer 326 between crucible 320 and inner mold surface 114.

The fusion process can be divided into five stages defined by variations among fusion power, fusion front location and vacuum at the fusion front. FIGS. 4A-4D illustrate successive steps in the process with the unhatched portions representing unfused grain and the hatched portions representing different layers of fused grain. A first general description of the five stages is provided with reference to Table 1 and FIGS. 4A-4D followed by a more detailed description of the process in accordance with the Table 1 parameters.

Referring to Table 1, the first stage is starting of skin formation. Skin 402 is formed with bore 134 substantially at atmospheric pressure. In one embodiment of this invention, the evacuation system 501 is stopped by opening the leak valve 503 to the air while running the pump 502. In this embodiment, evacuation system 501 is not activated at this skinning stage because evacuation may be harmful to uniformity of the skin. Normally the mold is designed to locate air channels, like 118 and 120, where high levels of bubble-free characteristics and less-bubble-growth characteristics are required. These are typically at the corner radius and bottom of the crucible, because when the formed crucible is used in the CZ process, duration of the contact with silicon melt is significant there. If the evacuation system is activated before a skin is formed, hot plasma gas is directed to the air channels. As the result, thick skin is formed at the air channel positions, and thinner skin is formed elsewhere. This produces a skin of uneven thickness, which is difficult to remove by sublimation or otherwise. In addition, a thin uniform skin helps to lower the pressure at the fusion front at the air channel location.

TABLE 1

(Crucible A)

| | Electric Power | Evacuation Power | event | fused grain/ fusion front | pressure at fusion front | sublimation | comment |
|---|---|---|---|---|---|---|---|
| 1st. stage | 100 | 5 | skin start evenly | pure silica/ slow | 5 | negligible | skin at atmospheric pressure Skin is even in thickness |
| 2nd. stage | 100 | 100 | skin complete | pure silica/ slow | 100 | negligible | skin complete under vacuum |
| 3rd. stage | 600 | 100 | bubble free layer | natural quartz/ fast | 100 | medium | clear layer formed mainly from natural quartz grain |
| 4th. stage | 600 | 30 | opaque layer | natural quartz/ fast | 30 | medium | opaque layer formed |
| 5th. stage | 850 | 30 | skin removal | natural quartz/ almost stop | 30 | high | pure silica skin sublimated, small portion of natural layer can be sublimated also |

One sophisticated method to manipulate the location of skinning is to provide another set of air channels (not shown in these embodiments) other than those air channels prepared for bubble free areas, and to accelerate skinning by evacuating through these channels. But stopping air flow through the air channels during skin formation while controlling the power and position of the electric arc is practically sufficient and economical to produce a uniform and thin skin.

The second stage is completion of skin and starting of evacuation. Most of the surface of the grain layer is covered by a skin 402, so that pressure at the fusion front can be lowered at this stage by activating the evacuation system 501. Because the skin is not perfect especially at the upper portions of the mold, pressure at the fusion front is strongly related to the "leakage" through the unfused grain between the skin 402 and the inner mold surface 114.

During the first and the second stages, fusion power is controlled at the required minimum to form a skin, otherwise skin 402 will become too thick to be sublimated off later. The skin 402 after activating evacuation system 501 can be free of bubbles but would show bubble-growth during CZ process. This is probably because silica glass fused at low power is not well degassed and therefore shows bubble-growth at high temperatures like the CZ process. In one embodiment, the evacuation system is activated by closing the leak valve 503. In this embodiment, fusion power is increased as soon as the evacuation system is activated. In one embodiment of this invention, fusion power was increased 10 seconds after evacuation system was activated.

The third stage fuses a bubble free layer under the skin 402 by increasing fusion power. The evacuation system 501 has been activated at the end of stage two. Now, the relatively long distance from the upper surfaces of the entire silica grain layer to the first openings increases the resistance to pump flow. This, in turn, increases the pressure drop between the atmosphere above the upper surfaces of the entire silica grain layer and the manifolds 128, 130 and 132. As a result, the pressure at the fusion front is reduced and gas is rapidly drawn away from the fusion front and into the manifolds 128, 130 and 132 by the pump 502. In addition to good skin coverage, which assures a good vacuum level, high power fusion is required to reduce bubble growth when the crucible will be used in the CZ process. High power fusion is presumed to help degassing the fused silica glass. In one embodiment, electric power to the electrode is increased to 600 kVA at the third stage.

Depending how thick the pure silica grain is, a bubble-free layer can be pure silica glass or a combination of pure silica glass formed from grain layer 230 and natural quartz glass formed from grain layer 228. This bubble-free layer constitutes inner crucible layer 322.

The fourth stage fuses opaque outer crucible layer 324 outside of the inner crucible layer 322. By reducing evacuation power, bubbles can be introduced at the fusion front. To control bubble size and bubble amount, and also to reduce bubble growth, controlled vacuum and relatively high power are required at this stage. In one embodiment, a set of the controlling valves 504 is operated to keep 680 Torr. at the pressure gauge 505 while applying 600 kVA to the electrodes.

The fifth stage of fusion is removal of the above mentioned skin 402. As the skin 402 was fused at low fusion power and mainly at atmospheric pressure, the skin 402 is not bubble-free and those bubbles would grow during a CZ process. This skin 402 therefore has to be removed. The best method to remove the skin is sublimation of the silica glass that forms the skin. In one embodiment of the present invention, electric power was boosted by 42%, from 600 kVA to 850 kVA. The power level and boosted step can be altered depending on the apparatus configurations, such as shielding, efficiency of power supply and ventilation in the crucible interior.

The fusion front almost stops at a saturated point leaving some unfused grain 326 between mold 112 and crucible 320 at the end of stage four.

This fifth stage can be combined to or overlapped with the third and/or fourth stage, because some amount of sublimation normally occurred at these stages. However, an additional stage removes the skin thoroughly. The fifth stage is preferably designed for sublimation only, minimizing progress of the fusion front. Another reason to sublimate at the final stage is to prevent deposits of sublimated material on the electrodes, which then drop back into the crucible resulting in "fume-deposit" defects on the crucible. The fifth stage, or sublimation stage, is required to minimize aluminum build up left after sublimation of the skin, which naturally occurs during the earlier stages. Removing the skin requires more intense sublimation than would normally occur. In one embodiment, pure silica glass corresponding to 0.8 mm to 1.2 mm thickness of pure silica grain layer is used to make the skin that is then later sublimated. This layer is fused from grain that is in pure silica grain layer 230 in FIG. 2B. The design of the final crucible structures, including the bubble free layer, purity profile in the crucible layers, grain forming, fusion power program and evacuation programs may be customized.

There is a conflict between better sealing and better purity at the innermost layer. Thicker skin helps to form a better clear layer underneath, but thinner skin leaves less impurity leftover after the skin is sublimated. In one embodiment, a layer of pure silica grain of about 0.8 mm to 1.2 mm was used to form the skin. After taking off the skin by sublimation, the impurity profile is improved over the prior art. When, instead of pure silica grain, natural quartz grain was used for the skin, the impurity profile was stronger after sublimation.

The innermost layer of pure silica grain can be thicker than that required for skin formation. After sublimation, the crucible may a have bubble free and bubble-growth free pure silica layer on the natural quartz glass layer. Depending on the thickness of the pure silica grain and when evacuation power is reduced, bubble structure of the final crucibles can be finely controlled to desired qualities and depths.

In one embodiment, the inner half of the bubble free layer was made from pure silica grain and the outer half of the bubble free layer and the opaque outer layer were made from natural quartz glass (FIGS. 5A-5D).

The effects of a CZ process on the crucible 320 can be estimated by performing a vacuum bake test simulating a CZ process. For example, a vacuum bake test can include heating the crucible piece at about 1650° C. for three hours at a pressure of 0.1 Pa. argon atmospheres.

The crucibles according to the present invention do not have localized bubble containing areas or areas that show bubble growth in response to this vacuum bake test, especially on the bottom and around the corner radius. Accordingly, disturbances in the single-crystalline structure of a silicon ingot pulled during a CZ process attributable to particle generation as a result of bubble dissolution from the inner crucible layer 322, are prevented.

An exemplary method of forming the above-described inner and outer crucible layers 322 and 324 will now be described in more detail with respect to FIGS. 4A-4D and Table 1.

FIGS. 4A-4D are cross-sectional views illustrating a method of fusing a crucible at various stages of a crucible-fusion process, according to one embodiment of the present invention. Table 1 is a summary of the five stages according to the above mentioned embodiment of the present invention.

In Table 1, electric power to the arc is shown in units of kVA. The evacuation power is shown in arbitrary units. The value 100 corresponds to the reading of gauge 505 with vacuum pump operation at 800 m³/hr. Main events at each the stages are described in the table. The grain to be fused at each stage is described along with the qualitative speed of fusion front progression. The vacuum level or pressure at the fusion front is shown using arbitrary units. Because the pressure is not uniform for the whole fusion front, the numbers are understood as relative numbers. On the low end, the value 5 is almost atmospheric pressure at the gauge 505 and the value 100 is about 150 Torr. at the gauge 505. Amount of sublimation and comments are also given in the table.

Referring to FIG. 4A and Table 1, in the first stage of the crucible-fusion process, a portion of the pure silica grain layer 230 at the innermost surface is fused to form a skin layer 402. During stage 1, power applied to the electrodes 312 and 314 may be about 100 kVA or less. In one embodiment, the power applied to the electrodes 312 and 314 may have a range from about 40 kVA to about 80 kVA. During stage 1, the evacuation system 501 may be stopped, such that a pressure measured at gauge 505 is about 760 Torr.

This condition continues to stage two where skin covers almost 80% of the final crucible shape. Because the major portion of the skin layer 402 is formed by fusing without evacuation, the skin layer 402 may contain bubbles. Because the skin layer 402 is formed by fusing at relatively low electric power, the skin layer may also show bubble growth in a CZ process.

At the end of stage two, the evacuation system 501 is activated. In one embodiment, pump 502 was kept running during stage 1 and stage 2 with the leak valve 503 open to the air so as not to evacuate gas through the bore 134. For example, the pressure measured at the gauge 505 may be dropped to 150 Torr. after the evacuation system is activated.

Referring next to FIG. 4B and Table 1, in a third stage of the crucible-fusion process, the remainder of the formed entire silica grain layer that is natural quartz grain layer 228, is fused to form a bubble free fused silica layer 404a. During stage 3, power applied to the electrodes 312 and 314 may be about 600 kVA. The evacuation system 501 is kept running to ensure that the natural quartz glass layer 404a contains substantially no bubbles. In one embodiment, the duration of stage 3 may correspond to a time sufficient to ensure that the inner layer 322, which is the same as 404a in the case of FIGS. 4A-D, has a thickness of about 2.0 mm to about 6.0 mm. It will be appreciated that the pump 502 may be operated during stage 3 to evacuate gas at the flow rates in a manner described in U.S. Pat. No. 7,383,696, which is incorporated herein by reference in its entirety, to form the inner layer 322.

Some of the skin layer 402 may be sublimated during stage 3, but the amount is relatively small.

Referring next to FIG. 4C and Table 1, the fourth stage of the crucible-fusion process, a remaining portion of the entire silica grain layer, which is natural quartz grain layer in this case, is fused to form opaque outer crucible layer 324. In the case of FIGS. 4A-D, the opaque natural quartz glass layer composes the outer layer 324. The evacuation power is reduced to introduce a sufficient amount of bubbles while assuring fusion power is large enough to reduce bubble growth during the CZ process, in a manner described in U.S. Pat. No. 7,383,696. At the end of stage 4, the fusion front is almost stopped at the equilibrium position between heating by electric arc from inside and cooling resulting from contact with cold wall of the mold. In one embodiment of this invention, the fusion front is nearly stopped when power is removed leaving 2 mm to 3 mm unfused grain 326 between fused crucible 320 and an inner mold surface 114.

Referring next to FIGS. 4D and Table 1, the fifth stage of the crucible-fusion process is to eliminate the skin 402 by sublimation. The fusion power is applied not for fusing the entire silica grain layer to the target dimensions, but mainly for sublimation of the skin 402. In one embodiment, the power applied to the electrodes 312 and 314 was 850 kVA.

Upon removing the skin layer 402 from the inner layer 404a, about 0.1 mm to about 2.0 mm of the pure silica glass may be sublimated to ensure that the skin layer 402 is sufficiently removed. In one embodiment, about 0.6 mm of the pure fused silica layer 402 is sublimated to ensure that the skin layer 402 is sufficiently removed. In one embodiment, the inner crucible layer 322 has a thickness of about 2.0 mm to about 6.0 mm after removal of the skin 402.

Figure 6:
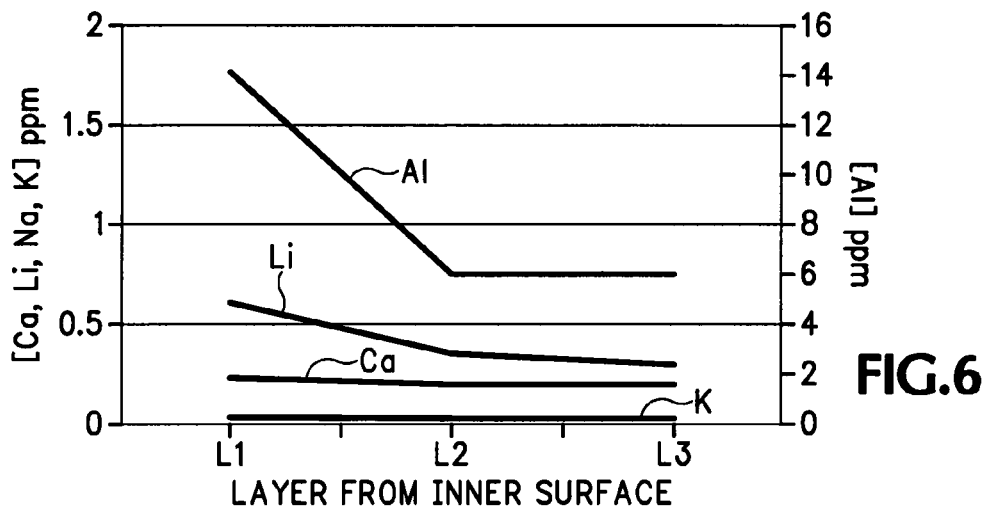
FIG. 6 shows the impurity profile at the surface of the inner crucible layer, according to one embodiment of the present invention.

According to the process exemplarily described above in FIGS. 4A-4D with Table 1, the pure silica grain is mainly used for skin and is sublimated later, leaving the innermost surface of the crucible inner layer 322 similar to a natural quartz glass. FIG. 6 shows the impurity profile on the crucible inner layer 322 at the one embodiment of this invention. Three consecutive surface layers with about 30 micrometers in thickness, were etched off and analyzed. The innermost layer was 14 ppm Al, 0.2 ppm Ca, 0.6 ppm Li and less than 0.14 ppm K.

It should be appreciated that this is not obvious for the innermost surface to have similar purity as natural quartz grain purity. It is appreciated that the purity level is still an order of magnitude better than the comparative example of traditional method shown in Table 4. This will be explained more detail later as a comparative example with Table 4 and FIG. 8.

Figures 5A, 5B:
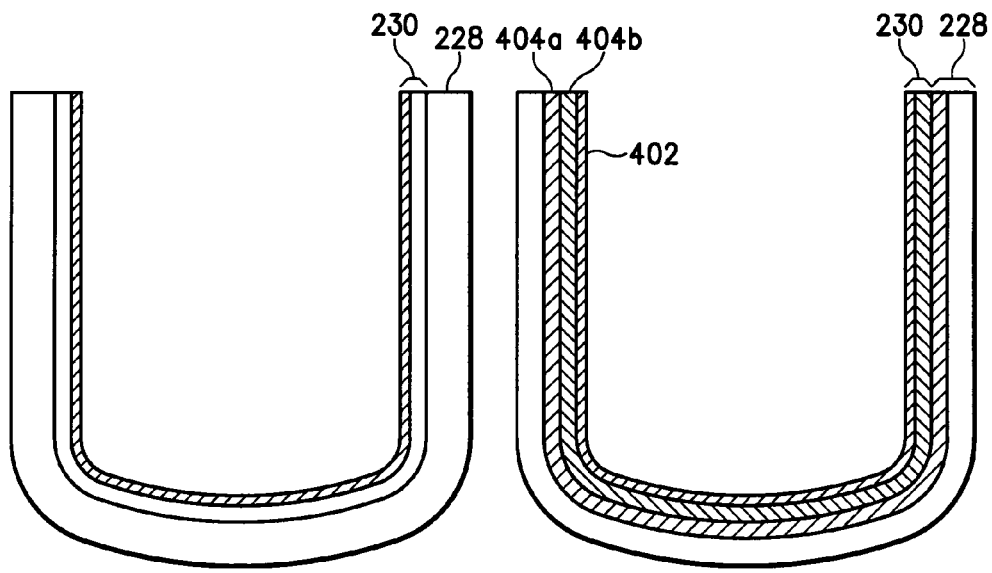
FIGS. 5A-5D are cross-sectional views illustrating a method of fusing a crucible at various stages of a crucible-manufacturing process, according to another embodiment of the present invention.

Another embodiment of this invention is illustrated in FIGS. 5A-5D with Table 2. The formed grain layers as shown in FIG. 5A are different from the previous case shown in FIG. 4A. Pure silica grain layer 230 is thicker than that required for the skin. The bubble free layer fused at the stage 3 is fused from pure silica grain 230 and from natural quartz grain layer 228 as shown in FIG. 5B. Normally a crucible should have a thicker bubble free layer than the layer that is dissolved during CZ process. As an economical solution, the bubble free layer is designed to have pure silica layer 404b and natural quartz glass layer 404a.

TABLE 2

(Crucible B)

| | Electric Power | Evacuation Power | event | fused grain/ fusion front | pressure at fusion front | sublimation | comment |
|---|---|---|---|---|---|---|---|
| 1st. stage | 100 | 5 | skin start evenly | pure silica/ slow | 5 | negligible | skin at atmospheric pressure Skin is even in thickness |
| 2nd. stage | 100 | 100 | skin complete | pure silica/ slow | 100 | negligible | skin complete under vacuum |
| 3rd. stage | 600 | 100 | bubble free layer | natural quartz + pure silica/ fast | 100 | medium | clear layer formed, purity wise double layer [pure/natural] |
| 4th. stage | 600 | 30 | Opaque layer | natural quartz/ fast | 30 | medium | opaque layer formed |
| 5th. stage | 850 | 30 | Skin removal | natural quartz/ almost stop | 30 | high | pure silica skin sublimated leaving pure silica surface |

Figures 5C, 5D:
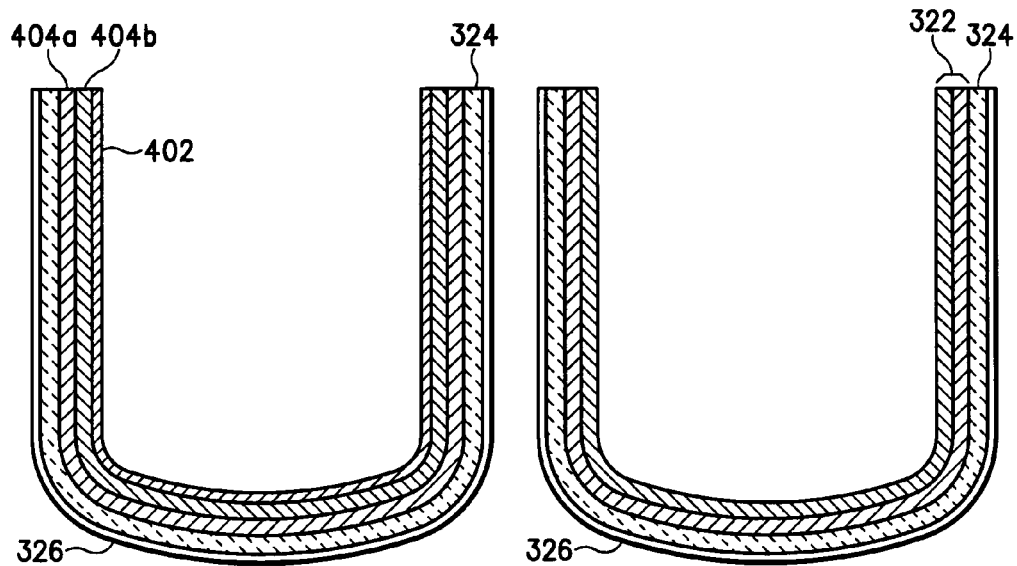

Opaque outer crucible layer 324 is fused as shown in FIG. 5C in a similar way as shown in FIG. 4C.

FIG. 5D is illustration of the completion of the fusion process. The crucible processed as shown in the Table 2 has a pure silica bubble-free layer as an inner portion of the inner layer 322. In one embodiment, pure silica grain was formed with less than 0.2 ppm for all of Al, Ca, Li, Na and K. The innermost surface layer with about 30 micrometers in thickness had 2 ppm Al, 0.2 ppm Ca, 0.5 ppm Li and less than 0.1 ppm K. The impurity profile observed by three layer analysis is shown in the FIG. 7. The observed increase of impurities is supposed to be attributed to diffusion from natural quartz glass layer 404a.

One comparative example is shown in Table 3 with no figures. The evacuation system is operating from the starting of stage 1. A localized skin was observed as a localized area to show bubble growth very near surface by vacuum bake test. This bubble growth layer is observed at corner radius, where major evacuation openings are located. The crucibles was used in CZ process and showed inferior results showing structure loss towards the end of crystal pulling.

TABLE 3

(Crucible C <comparative example>)

| | Electric Power | Evacuation Power | event | fused grain/ fusion front | pressure at fusion front | sublimation | comment |
|---|---|---|---|---|---|---|---|
| 1st. stage | 100 | 100 | skin start locally | pure silica/ slow | 5 | negligible | skin at atmospheric pressure Skin is uneven in thickness |
| 2nd. stage | 100 | 100 | skin complete | pure silica/ slow | 100 | negligible | skin complete under vacuum |
| 3rd. stage | 600 | 100 | bubble free layer | natural quartz + pure silica/ fast | 100 | medium | clear layer formed, purity wise double layer [pure/ natural] |
| 4th. stage | 600 | 30 | opaque layer | natural quartz/ fast | 30 | medium | opaque layer formed |
| 5th. stage | 850 | 30 | skin removal | natural quartz/ almost stop | 30 | high | pure silica skin sublimated, but not completely, leaving partial skin which was fused at low power |

Table 4 shows a traditional known method of making a crucible, as described in U.S. Pat. No. 7,383,696 for example.

TABLE 4

(Crucible D - Traditional method <comparative example>)

| | Electric Power | Evacuation Power | event | fused grain/ fusion front | pressure at fusion front | sublimation | comment |
|---|---|---|---|---|---|---|---|
| 1st stage + 2nd. stage | 100 | 100 | skin uneven | pure silica/ skin complete fast | 10-20 | negligible | skin at atmospheric pressure Skin is uneven and localized |
| 3rd. stage-1 | 500 | 100 | bubble free layer | pure silica/ fast | 70 | medium low | clear layer formed, while skin is not completed |
| 3rd. stage-2 | 600 | 100 | bubble free layer | natural quartz + pure silica/ fast | 100 | medium | clear layer formed, purity wise double layer [pure/ natural] |
| 4th. stage-1 | 600 | 10 | opaque layer | natural quartz/ fast | 30 | medium high | opaque layer formed |
| 4th. stage-2 | 600 | 10 | opaque layer | natural quartz/ almost stop | 30 | medium high | sublimation not enough to eliminate skin, localized thick skin can not be removed |

There is no pure silica grain layer formed. The fusion process completed after the dimensions for diameter and thickness were obtained. Electric power of 600 kVA was sufficient to get desired dimensions. The vacuum bake test resulted in a thin layer of innermost surface showed bubble growth. The inner surface of the crucible with 30 micrometers in thickness was analyzed to show 110 ppm Al, 1.8 ppm Ca, 1.3 ppm Li and 0.1 ppm K. Impurity profile of this crucible is shown in the FIG. 8.

Figure 7:
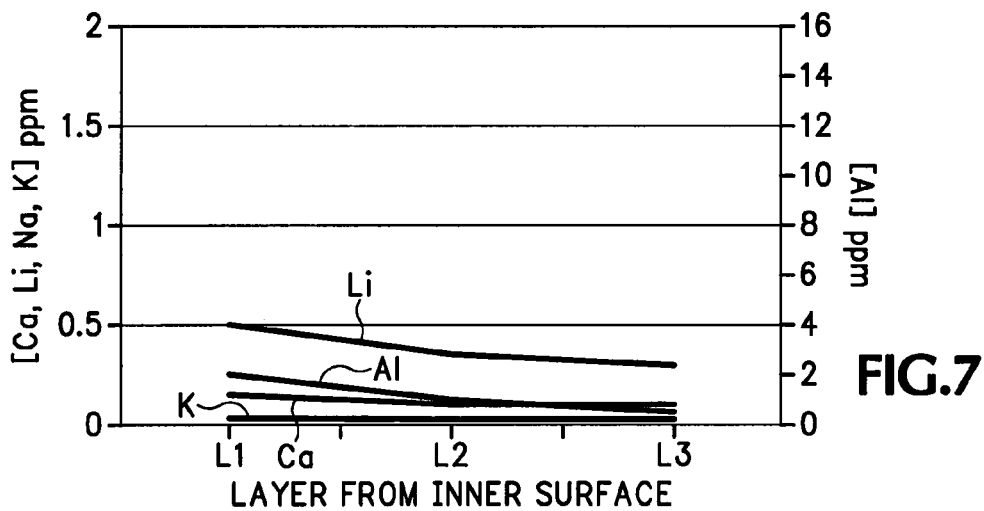
FIG. 7 shows the impurity profile at the surface of the inner crucible layer, according to another embodiment of the present invention.
Figure 8:
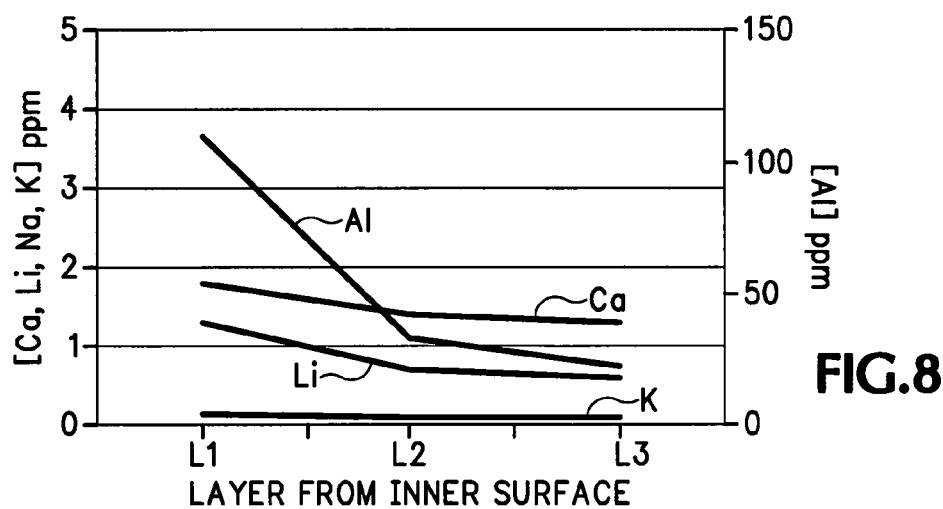
FIG. 8 shows the impurity profile at the surface of the inner crucible layer, according to a traditional method of manufacturing a crucible.

FIGS. 6, 7 and 8 comprise graphs of the impurities within the innermost wall of each of crucibles A, B and D, respectively. The L1 data point in each graph was established by etching the innermost crucible layer to a depth of 30 micrometers and analyzing the etched solution. The L2 data point was established by further etching another 30 micrometers and analyzing the etched solution with the L3 data point resulting from further etching and analyzing another 30 micrometers.

Figure 9:
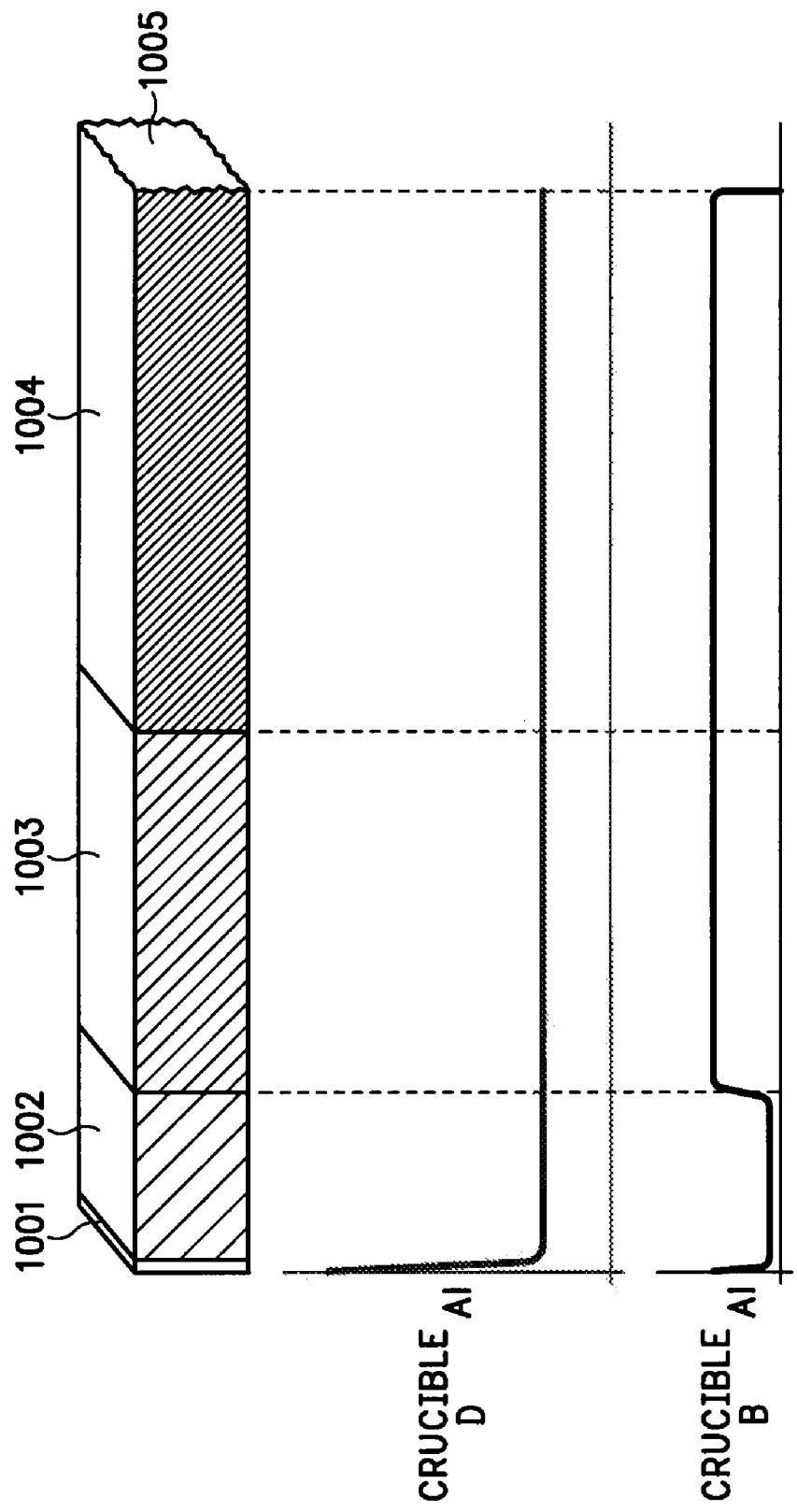
FIG. 9 illustrates a core sample from a crucible and a corresponding Aluminum profile for one process according to an embodiment of the invention and another comparative process.

FIG. 9 is a core sample including an innermost layer 1001, which is used to create the impurity profile shown; a pure silica layer 1002, which includes layer 1001; a bubble free and slow-bubble growth layer 1003, which includes layers 1001, 1002; and an opaque layer 1004, which includes bubbles that extend between layer 1003 and the radially outer surface 1005 of the crucible. The graphs below the sample show the Aluminum across the wall of the crucible for two different processes, one for Crucible D, as described in Table 4 and one for Crucible B, as described in Table 2. Crucible D was used in a CZ process; it presented difficulties in starting pulling. Several retrials were required to start pulling.

EXAMPLES

Test Example 1

A natural quartz grain was formed in the rotating mold as natural grain layer. A synthetic silica grain with 3.5 mm in thickness was formed as a pure silica grain layer on the natural quartz grain layer. The synthetic silica grain contained less than 0.2 ppm of each of Al, Ca, Li, Na and K. The natural quartz grain had, 6 ppm Al, 1.3 ppm Ca, 0.7 ppm Li, 0.05 ppm Na and 0.1 ppm K.

The rotating mold had a cavity with a diameter of 463 mm. A programmable DC power supply of 1000 kVA was connected to the graphite electrodes. The evacuation system had evacuation capacity of 800 m$^3$/hr and a set of valves and piping to control evacuation power.

The five steps of fusion program were operated as shown in the Table 2.

The total of the first and the second stage took 2 minutes. The evacuation system was inactivated by opening the leak valve and activated (by closing the valve) at 1 minutes and 50 seconds. The electric power at stage 1 and stage 2 was 60 kVA to 100 kVA. The vacuum sensor located by the evacuation bore 134 was used to monitor pressure at the fusion front. The reading does not represent the pressure at the fusion front, but indicates relative values. The pressure reading at stage 3 was 150 Torr. The electric power was raised from 100 kVA to 600 kVA for stage 3 and stage 4. For stage 4, the evacuation system was tuned to 680 Torr. at the sensor position.

At the stage 5 the electric power was increased to 850 kVA and extensive fume generation was observed.

After cooling down, the fused part was pulled out from the mold and cut to the required height. Outer diameter was 457 mm with 11.5 mm wall thickness.

One crucible was cut to coupons for vacuum bake test. After performing a vacuum bake test in which the crucible was baked at approximately 1650° C. for approximately three hours at a pressure of approximately 0.1 Pa. argon, it was determined that the crucible had an inner crucible layer 3.5 mm thick, which was substantially free of bubbles and showed no significant bubble growth.

About 30 μm of the inner crucible layer was dissolved for analysis. Three consecutive layers were analyzed. The concentration profiles were given in the FIG. 7.

The crucible was used for CZ process without any problems associated with crystalline structures.

Test Example 2

A crucible was prepared according to the same procedure outlined for the Test Example 1, except that a 1.5 mm thick synthetic silica grain layer was formed on the natural quartz grain layer.

The five steps of fusion program were operated as shown in the Table 1, otherwise the same Test example 1.

Three innermost layers were analyzed to know the impurity profile, as shown in the FIG. 6. Purity of innermost layer, layer L1, is not as pure as Test Example1, but an order of magnitude better than the comparative examples below.

The crucible performed equally well concerning structure loss. The silicon melt should have more impurities than the case of example 1, but was not critical with respect to structure loss.

Comparative Example 1

A crucible was prepared according to the same procedure outlined for the Test Example 1, except fusion stages were taken as shown in Table 3. The biggest difference is that the evacuation system has been activated from the beginning of stage 1.

A vacuum bake test results showed a layer of bubbles around the corner radius, indicating that the skin was not completely removed.

The crucible was used at CZ process, but three repeated trials were required before successful start of the pulling single crystal.

Comparative Example 2

A crucible was prepared according to the same procedure outlined for the Test Example 1, except that no synthetic grain silica layer was formed on the natural quartz grain layer. The fusion stages are as shown in the Table 4. There is no fifth stage for intentional sublimation. Fusion was stopped when required dimensions, diameters and wall thicknesses, were met. The impurity profiles are shown in FIG. 8. Even there was no sublimation stage at high powers, such as 850 kVA, a huge impurity pile up was observed. Aluminum content in the first layer L1 was 110 ppm, which is order 7.8 times larger than Example 2 and 55 times more than Example 1.

With this crucible, successful CZ pulls were less than 70%. Even for the successful pulls, several retrials were required for finishing the pull.

What is claimed is:

1. A method of making a silica crucible in a mold cavity of the type in which air can be drawn through silica grain in the cavity comprising:
    forming a first silica grain layer in the mold cavity;
    forming a pure silica grain layer on the first silica grain layer;
    fusing at least a portion of the pure silica grain layer while drawing substantially no air through the silica grain;
    fusing any remaining pure silica grain layer and at least a portion of the first silica grain layer while drawing a substantially higher volume of air through the silica; and
    sublimating at least a portion of the fused pure silica grain layer.

2. The method of claim 1 wherein the pure silica grain layer contains less than about 1 ppm aluminum.

3. The method of claim 2 wherein the pure silica grain layer contains less than about 0.2 ppm aluminum.

4. The method of claim 1 wherein the pure silica grain layer comprises synthetic silica grain containing less than about 1 ppm metallic impurities.

5. The method of claim 1 wherein the thickness of the pure silica grain layer is less than about 3 mm and the thickness of the sublimated portion is more than about 0.5 mm.

6. The method of claim 1 wherein the thickness of the pure silica grain layer is less than about 1.5 mm and the thickness of the sublimated portion is more than about 0.8 mm.

7. The method of claim 1 wherein the portion of the pure silica grain layer fused while drawing substantially no air through the silica grain has a substantially uniform thickness.

8. The method of claim 1 wherein fusing at least a portion of the pure silica grain layer while drawing substantially no air through the silica grain comprises doing so at a relatively low fusion power.

9. The method of claim 8 wherein fusing any remaining pure silica layer and at least a portion of the first silica grain layer while drawing a substantially higher volume of air through the silica further comprises doing so at a second fusion power substantially higher than the relatively low fusion power.

10. The method of claim 8 wherein the relatively low fusion power is less than about 300 kVA.

11. The method of claim 8 wherein the relatively low fusion power is less than about 200 kVA.

12. The method of claim 8 wherein sublimating at least a portion of the fused pure silica grain layer comprises doing so at a third fusion power that is higher than the second fusion power.

13. The method of claim 12 wherein the third fusion power is more than about 700 kVA.

14. The method of claim 8 wherein the relatively low fusion power is less than about 300 kVA and wherein the method further comprises:
raising the relatively low fusion power to more than about 500 kVA; and
drawing the substantially higher volume of air through the silica no less than 20 seconds before the fusion power is raised to more than about 500 kVA.

15. The method of claim 1 wherein the method further comprises fusing at least a portion of the pure silica grain layer while drawing substantially no air through the silica grain for more than about 30 seconds.

16. The method of claim 1 wherein the method further comprises fusing at least a portion of the pure silica grain layer while drawing substantially no air through the silica grain for more than about 60 seconds.

17. The method of claim 1 wherein sublimating at least a portion of the fused pure silica grain layer comprises sublimating at least a portion of the fused pure silica grain layer for between about 20 seconds and about 240 seconds.

18. The method of claim 1 wherein sublimating at least a portion of the fused pure silica grain layer comprises sublimating at least a portion of the fused pure silica grain layer for between about 20 seconds and about 120 seconds at a fusion power greater than about 700 kVA.

19. The method of claim 1 wherein after sublimating at least a portion of the fused pure silica grain layer, the innermost 30 micrometers of the fused pure silica grain layer contains less than about 20 ppm aluminum.

20. The method of claim 1 wherein after sublimating at least a portion of the fused pure silica grain layer, the innermost 30 micrometers of the fused pure silica grain layer contains less than about 4 ppm aluminum and the crucible so made has an innermost layer that is between about 2 mm and about 6 mm.

21. The method of claim 1 wherein sublimating at least a portion of the fused second silica grain layer comprises sublimating only a portion of the fused pure silica grain layer.

22. The method of claim 1 wherein sublimating at least a portion of the fused second silica grain layer comprises sublimating substantially the entire fused pure silica grain layer.

23. A method of making a silica glass crucible comprising:
forming a first silica grain layer in a mold cavity;
forming a second silica grain layer on the first silica grain layer;
fusing at least a portion of the second silica grain layer at a first temperature;
fusing at least a portion of the first silica grain layer at a second temperature greater than the first temperature; and
sublimating at least a portion of first silica grain layer.

24. The method of claim 23 further comprising:
fusing at least a portion of the second silica grain layer while substantially no gas is drawn through the grain; and
drawing gas through the grain and into ports distributed in the inner wall of the mold cavity while fusing the first silica grain layer.

25. The method of claim 23 further comprising sublimating the entire second silica grain layer.

26. The method of claim 23 further comprising sublimating only a portion of the second silica grain layer.

27. The method of claim 23 further comprising fusing at least a further portion of the second silica grain layer at the second temperature.

28. A method of fusing an inner silica layer and at least one additional silica layer containing a higher concentration of metallic impurities than the inner silica layer comprising:
forming a first fused silica layer by fusing at least a portion of the inner silica layer at a first power;
forming a second fused silica layer by fusing at least a portion of the at least one additional silica layer at a second power greater than the first power; and
sublimating a portion of the first fused silica layer.

29. The method of claim 28 further comprising:
fusing at least a portion of the inner silica layer while substantially no gas is drawn through the silica layers; and
drawing gas through the silica layers while fusing the second fused silica layer.

30. A method of making a silica crucible in a mold cavity of the type in which air can be drawn through the silica grain in the cavity comprising:
forming a first silica grain layer in the mold cavity;
forming a pure silica grain layer on the first silica grain layer;
fusing a first portion of the pure silica grain layer while drawing substantially no air through the silica grain at a relatively low fusion power;
fusing a second portion of the pure silica grain layer while drawing a substantially higher volume of air through the silica grain at a relatively high fusion power;
fusing at least a portion of the first silica grain layer while drawing a substantially higher volume of air through the silica; and
sublimating substantially all of the fused first portion of the pure silica grain layer.

31. The method of claim 30 wherein the first silica grain layer comprises a natural silica grain layer.

32. The method of claim 30 wherein the thickness of the fused portions formed while drawing a substantially higher volume of air through the silica grain is about 2.0 mm to about 6.0 mm.

33. The method of claim 30 wherein the concentration of aluminum in the inner crucible layer is less than about 1.0 ppm.

34. A method of making a silica crucible in a mold cavity of the type in which air can be drawn through silica grain in the cavity comprising:
  forming a silica grain layer in the mold cavity;
  fusing a first portion of the silica grain layer while drawing substantially no air through the silica grain; and
  fusing a second portion of the silica grain layer while drawing a substantially higher volume of air through the silica.

35. The method of claim 34 wherein the method further comprises fusing the first portion until a skin forms.

36. The method of claim 35 wherein the method further comprises fusing the second portion after the skin forms.

37. The method of claim 36 wherein the method further includes sublimating at least some of the innermost layer of the fused first portion while fusing the second portion.

* * * * *